US007714832B2

(12) United States Patent
Tong et al.

(10) Patent No.: US 7,714,832 B2
(45) Date of Patent: May 11, 2010

(54) MIXED MONOCHROME AND COLOUR DISPLAY DRIVING TECHNIQUE

(75) Inventors: Kuo-Feng Tong, Etobicoke (CA); Marc Drader, Kitchener (CA); Robert Lowles, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1135 days.

(21) Appl. No.: 10/858,070

(22) Filed: Jun. 2, 2004

(65) Prior Publication Data

US 2006/0007098 A1   Jan. 12, 2006

(51) Int. Cl.
*G09G 3/34* (2006.01)
(52) U.S. Cl. .................. 345/103; 345/102; 345/690; 345/211
(58) Field of Classification Search .......... 345/204, 345/209, 212–214, 690, 692, 87–90, 92, 345/94–96, 98–100, 102, 103
See application file for complete search history.

(56) References Cited

U.S. PATENT DOCUMENTS

| 5,917,462 | A * | 6/1999 | Suzuki et al. ............. 345/32 |
| 6,535,196 | B2 | 3/2003 | Walker et al. |
| 6,597,736 | B1 | 7/2003 | Fadel |
| 6,828,954 | B2 * | 12/2004 | Yoshihara et al. .......... 345/102 |
| 7,038,641 | B2 | 5/2006 | Hirota et al. |
| 7,176,879 | B1 * | 2/2007 | Yoshihara et al. .......... 345/102 |
| 7,233,304 | B1 * | 6/2007 | Aratani et al. ............. 345/87 |
| 2001/0017604 | A1 | 8/2001 | Jacobsen et al. |
| 2001/0043173 | A1 | 11/2001 | Troutman |
| 2002/0188880 | A1 | 12/2002 | Lowles et al. |
| 2003/0063077 | A1 | 4/2003 | Koyama |
| 2004/0027346 | A1 | 2/2004 | Naske |
| 2004/0140972 | A1 | 7/2004 | Hirota et al. |
| 2005/0062708 | A1 * | 3/2005 | Yoshihara et al. .......... 345/96 |

FOREIGN PATENT DOCUMENTS

| CN | 1409290 A | 4/2003 |
| EP | 0655725 A1 | 5/1995 |
| EP | 0 852 371 | 7/1998 |
| EP | 1 148 468 | 10/2001 |
| GB | 2378343 A | 2/2004 |
| WO | WO 01/91098 | 11/2001 |
| WO | 02/26905 A2 | 4/2002 |

OTHER PUBLICATIONS

Canadian Office Action dated Oct. 7, 2009.

* cited by examiner

*Primary Examiner*—Henry N Tran
(74) *Attorney, Agent, or Firm*—Perry + Currier Inc.

(57) ABSTRACT

A display screen is capable of having regions having different switching speeds as well as regions that are not switched. One region having a first switching speed may be for colour mode display and the other region having a second switching speed different from the first may be for monochrome mode display. Other regions may be off and not switched. In alternative versions, three or more switched regions may be established on a display screen. For example, a monochrome region may be nested inside a colour region, in which the colour region may be nested between off regions.

33 Claims, 16 Drawing Sheets

MIXED MONOCHROME AND COLOUR DISPLAY DRIVING TECHNIQUE

FIELD OF THE INVENTION

The present invention relates to the field of liquid crystal display and, particularly, to the field of multi-mode operation of a liquid crystal display screen.

BACKGROUND OF THE INVENTION

The use of high resolution displays combined with high refresh rates to provide a video/animation/graphical user experience can significantly increase the load on a handheld's power system. The current result is that end-users are able to enjoy a highly graphical experience at the expense of reduced battery life and/or increased battery mass and size. High resolution displays with high refresh rates are susceptible to substantial power losses due to switching inefficiencies associated with driving many pixels on a display at high frequency. For example, 80-90% of power requirements of a field-sequential display, excluding backlight illumination, are related to switching losses associated when the screen is refreshed at a rate such as 2500 Hz Field-sequential display switching power losses are 5 to 10 times greater than the power losses in conventional liquid crystal displays based on colour filters.

Thus, it would be desirable to reduce the switching power loss in a liquid crystal display. Also, to provide greater versatility for the user in a video/animation/graphical environment, it would be desirable to provide different viewing modes simultaneously on the display screen,

SUMMARY OF THE INVENTION

This invention addresses the problem of reducing the switching losses and, therefore, power requirements of a display while maintaining or increasing visual quality.

Switching losses associated with refreshing the screen at high rates can be reduced if the active area of the display can be categorized into regions such that each region can be electrically driven differently.

In cases where the active area of a display can be categorized into regions, this invention reduces switching losses by driving pixels in each region by an algorithm that minimizes power consumption while maintaining optical performance appropriate to the region's category. In this way, dynamic, high-power, high-refresh requirements can be isolated to regions containing colour or video, while low power, low refresh rates are applied to regions containing static "black and white" or monochrome text, In the case of field-sequential displays, the active area may be categorized into different regions, such as colour and monochrome regions. Therefore, images containing both types of regions can be driven in "Partial Colour Mode." The regions may be of different bit colour depths and different refresh rates.

Normally, the field-sequential display is updated at 2500 Hz and regions driven at this rate are capable of full colour video at 83 Hz. This dynamic, full colour capability, however, is not required to display monochrome text. In monochrome regions, the refresh rate can be safely reduced to 250 Hz (possibly 55 Hz) without loss in visual quality. In fact, visual quality may be improved if the driving waveforms are optimized to improve contrast in monochrome regions to benefit the display of data such as text.

The use of different driving schemes allows total power consumption to be reduced depending on the data being displayed while maintaining visual quality. In the case of field-sequential display, the switching losses are decreased by a factor of 10 within monochrome regions and overall power savings are proportional to the percentage of the active area categorized as monochrome. Up to 90% of switching losses can be eliminated by operating in "Partial Colour Mode" if the monochrome region occupies the entire display to yield a display device with power consumption similar to displays that use colour filters.

Partial Colour Mode can be implemented by a gate driver and controller to allow certain gate lines to be activated less frequently to reduce the refresh rate on the associated portions of the display.

BRIEF DESCRIPTION OF THE DRAWINGS

Embodiments of present invention will now be described by way of example with reference to attached figures, wherein.

DETAILED DESCRIPTION

The present invention relates to a method and device, especially a mobile station such as a handheld communications device, that practices the method for reducing power witching losses in a display. Preferably, the display is a liquid crystal display and the light source includes light emitting diodes (LEDs) of different colours. The liquid crystal display may be operated at a rate of 30 or more frames per second. The LCD controller provides a train of pulses during each frame that may be varied in number or length or both. The number of pulses or pulse width of a single pulse may be used to vary the grey scale of a pixel. The LEDs of the light source preferably will include red, green, and blue colours. Other colour schemes, such as cyan, magenta, and yellow, are contemplated by the present invention. The present invention may be implemented by adapting the LCD controller to drive the gate lines differently in a fame. Although the present invention is directed to a liquid crystal display per se, the preferred use of the LCD is in a mobile station.

Figure 1:
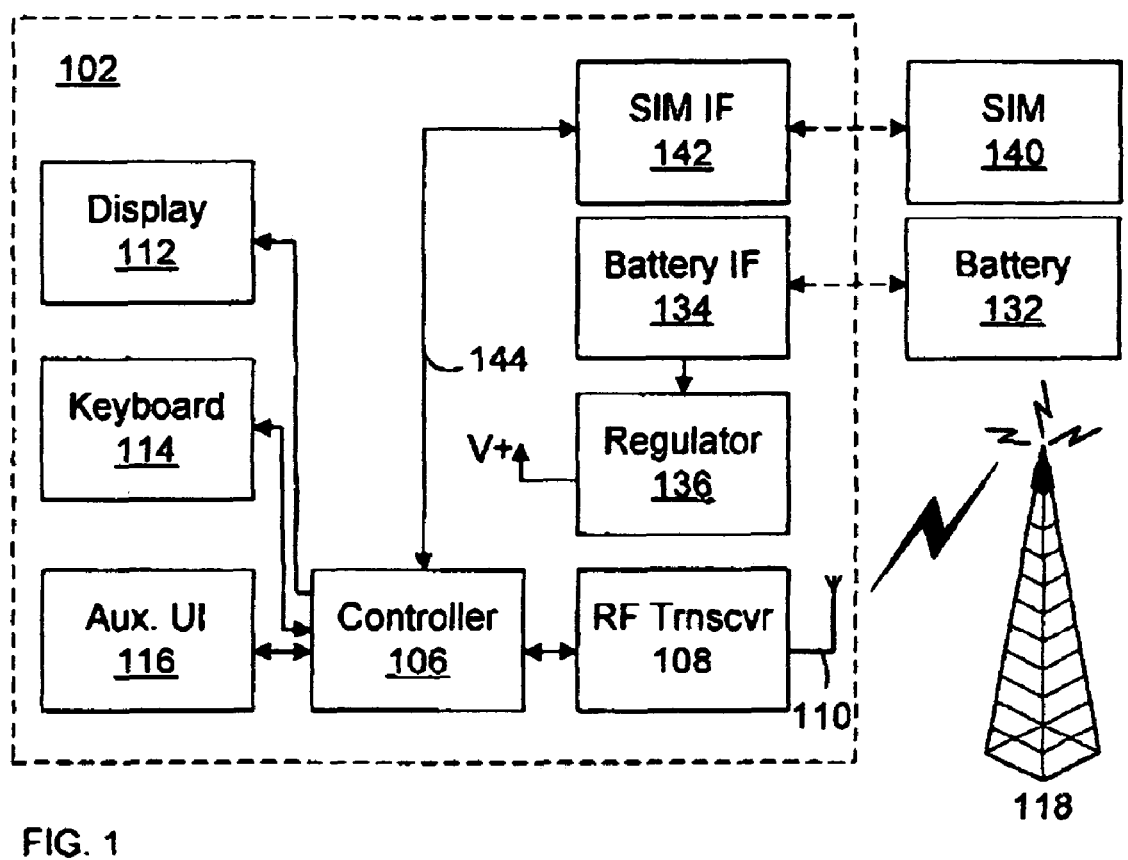
FIG. 1 is a block diagram that illustrates pertinent components of a wireless communications device that communicates within a wireless communication network according to the present invention.

FIG. 1 is a block diagram of a communication system 100 that includes a mobile station 102 that communicates through a wireless communication network. Mobile station 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network, a telephone number to place a telephone call, commands to be executed on mobile station 102, and possibly other or different user inputs.

Mobile station 102 sends communication signals to and receives communication signals from the wireless network over a wireless link via antenna 110. RF transceiver circuitry 108 performs functions similar to those of a base station and a base station controller (BSC) (not shown), including for example modulation/demodulation and possibly encoding/decoding and encryption/decryption. It is also contemplated that RF transceiver circuitry 108 may perform certain functions in addition to those performed by a BSC. It will be apparent to those skilled in art that RF transceiver circuitry 108 will be adapted to particular wireless network or networks in which mobile station 102 is intended to operate.

Mobile station 102 includes a battery interface (IF) 134 for receiving one or more rechargeable batteries 132. Battery 132 provides electrical power to electrical circuitry in mobile station 102, and battery IF 132 provides for a mechanical and electrical connection for battery 132. Battery IF 132 is coupled to a regulator 136 which regulates power to the device. When mobile station 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a Subscriber Identity Module (SIM) 140 which is connected to or inserted in mobile station 102 at a SIM interface (IF) 142. SIM 140 is one type of a conventional "smart card" used to identify an end user (or subscriber) of mobile station 102 and to personalize the device, among other things. Without SIM 140, the mobile station terminal is not fully operational for communication through the wireless network By inserting SIM 140 into mobile station 102, an end user can have access to any and all of his/her subscribed services. SIM 140 generally includes a processor and memory for storing information. Since SIM 140 is coupled to SIM IF 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile station. SIM 140 may store additional user information for the mobile station as well, including datebook (or calendar) information and recent call information.

Mobile station 102 may consist of a single unit, such as a data communication device, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Figure 2:
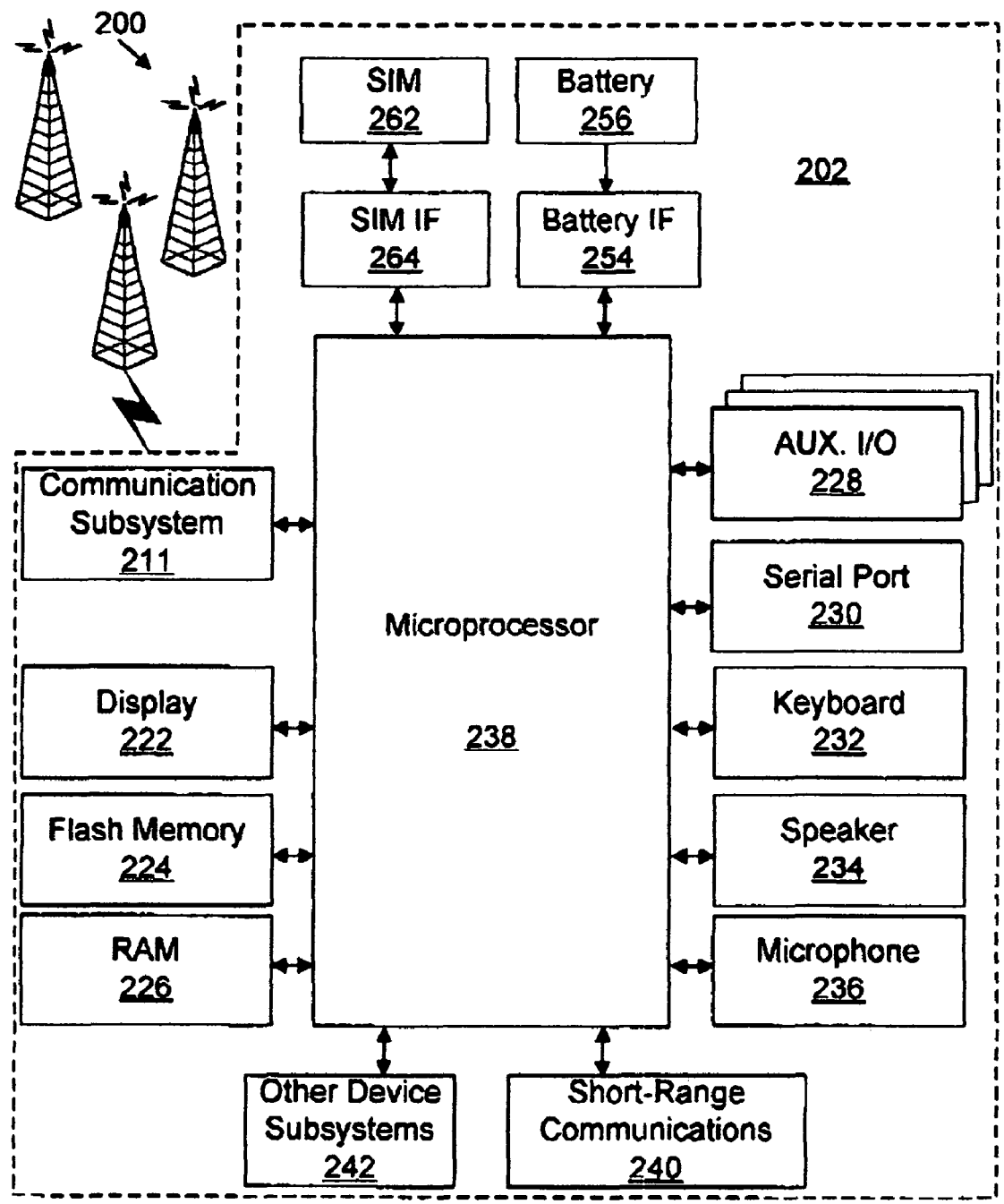
FIG. 2 is a more detailed diagram of a preferred wireless communications device of FIG. 1 according to the present invention.

FIG. 2 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of fixed transceiver stations 200 within its geographic coverage area.

Mobile station 202 will normally incorporate a communication subsystem 211, which includes a receiver, a transmitter, and associated components, such as one or more (preferably embedded or internal) antenna elements and, local oscillators (LOs), and a processing module such as a digital signal processor (DSP) (all not shown). Communication subsystem 211 is analogous to RF transceiver circuitry 108 and antenna 110 shown in FIG. 1. As will be apparent to those skilled in field of communications particular design of communication subsystem 211 depends on the communication network in which mobile station 202 is intended to operate.

Network access is associated with a subscriber or user of mobile station 202 and therefore mobile station 202 requires a Subscriber Identity Module or "SIM" card 262 to be inserted in a SIM IF 264 in order to operate in the network. SIM 262 includes those features described in relation to FIG. 1. Mobile station 202 is a battery-powered device so it also includes a battery IF 254 for receiving one or more rechargeable batteries 256. Such a battery 256 provides electrical power to most if not all electrical circuitry in mobile station 202, and battery IF 254 provides for a mechanical and electrical connection for it. The battery IF 254 is coupled to a regulator (not shown) which provides power V+ to all of the circuitry.

Mobile station 202 includes a microprocessor 238 (which is one implementation of controller 106 of FIG. 1) which controls overall operation of mobile station 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to the user such as, but not limited to, instant messaging (IM), e-mail, calendar events, voice mails, appointments, and task items. Naturally, one or more memory stores are available on mobile station 202 and SIM 262 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network 200, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222, to auxiliary I/O device 228 or both as described her herein below with reference to FIGS. 3-7. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

In accordance with an embodiment of the invention, mobile station 202 is a multi-tasking handheld wireless communications device configured for sending and receiving data items and for making and receiving voice calls. To provide a user-friendly environment to control the operation of mobile station 202, an operating system resident on station 202 (not shown) provides a GUI having a main screen and a plurality of sub-screens navigable from the main screen.

Figure 3:
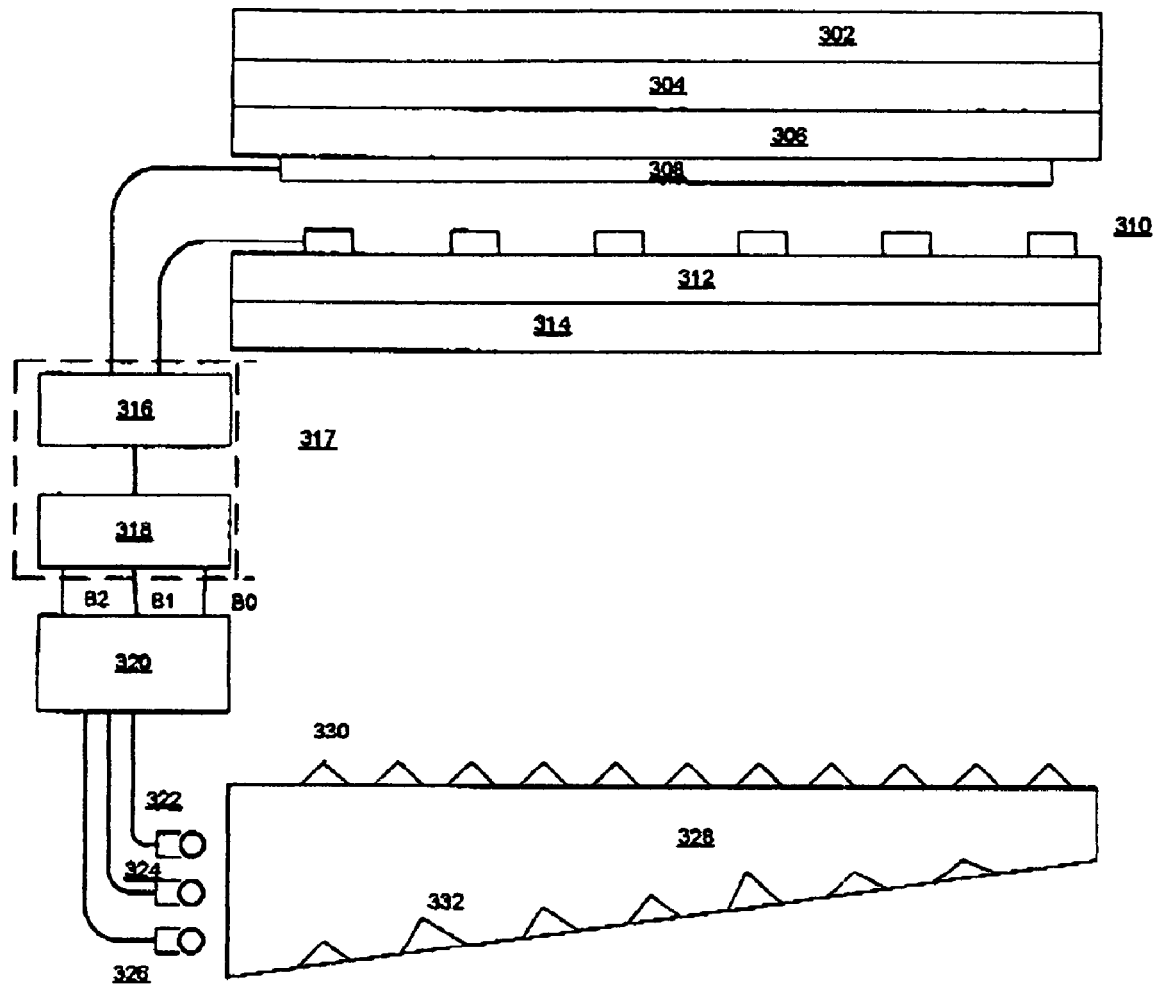
FIG. 3 illustrates an embodiment of a backlit liquid crystal display of the present invention.

The liquid crystal display cell 222 is shown in greater detail in FIG. 3 in which a light source formed from multiple LEDs 322, 324, 326 is used as a backlight. LCD controller 316 provides a voltage to the common electrode(s) 308 and the active elements 310 of the active matrix. The active elements are preferably thin film transistors. The common electrode(s) 308 and active elements are supported on substrates 306 and 312, respectively. The LCD preferably contains a brightness enhancing film or layer 304 to optimize the distribution of light for a viewer. As the preferred liquid crystal material is super twisted nematic, polarizers 302 and 314 are used. The LCD controller 316 sets the pixel grey scale of the LCD. An optional processor 318 may coordinate synchronization of the LCD controller 316 with the light source controller 320. Preferably, the LCD controller 316 and the processor 318 are integrated into a single device 317, which may simply be referred to as an LCD controller having the capability of controlling a light source controller 320. The light source may be implemented by using red, green, and blue LEDs 322, 324, 326. In a specific embodiment, four green, four red, and two blue LEDs are used to provide full colour and/or black and white display. The LED controller 320 may sequence the three colours or may simultaneously energized LEDs of all of the colours and terminate power to the LEDs simultaneously. Other combinations of LEDs are contemplated by the present invention. The light guide 328 may have a tapered block construction and may have approximately a trapezoidal form to more evenly distribute the light into the LCD. The light guide may also have uneven areas 330, 332 that scatter the light so as to avoid shadowing effects in the LCD image. Although uneven area 330 is shown to project out from the surface of the light guide 328 and uneven area 332 is shown to project inward to the surface of the light guide 328, the uneven areas may be arranged differently so long as the arrangement effectively scatters the light from the LEDs 322, 324, 326. The uneven areas may be abraded, molded, corrugated, chemically etched, or the like. Preferably, to maximize the utilization of light, the LEDs 322, 324, 326 and die light guide 328 are partially enclosed by a reflector such that the only opening is fully bounded by the light transmissive area of the LCD.

Figure 4:
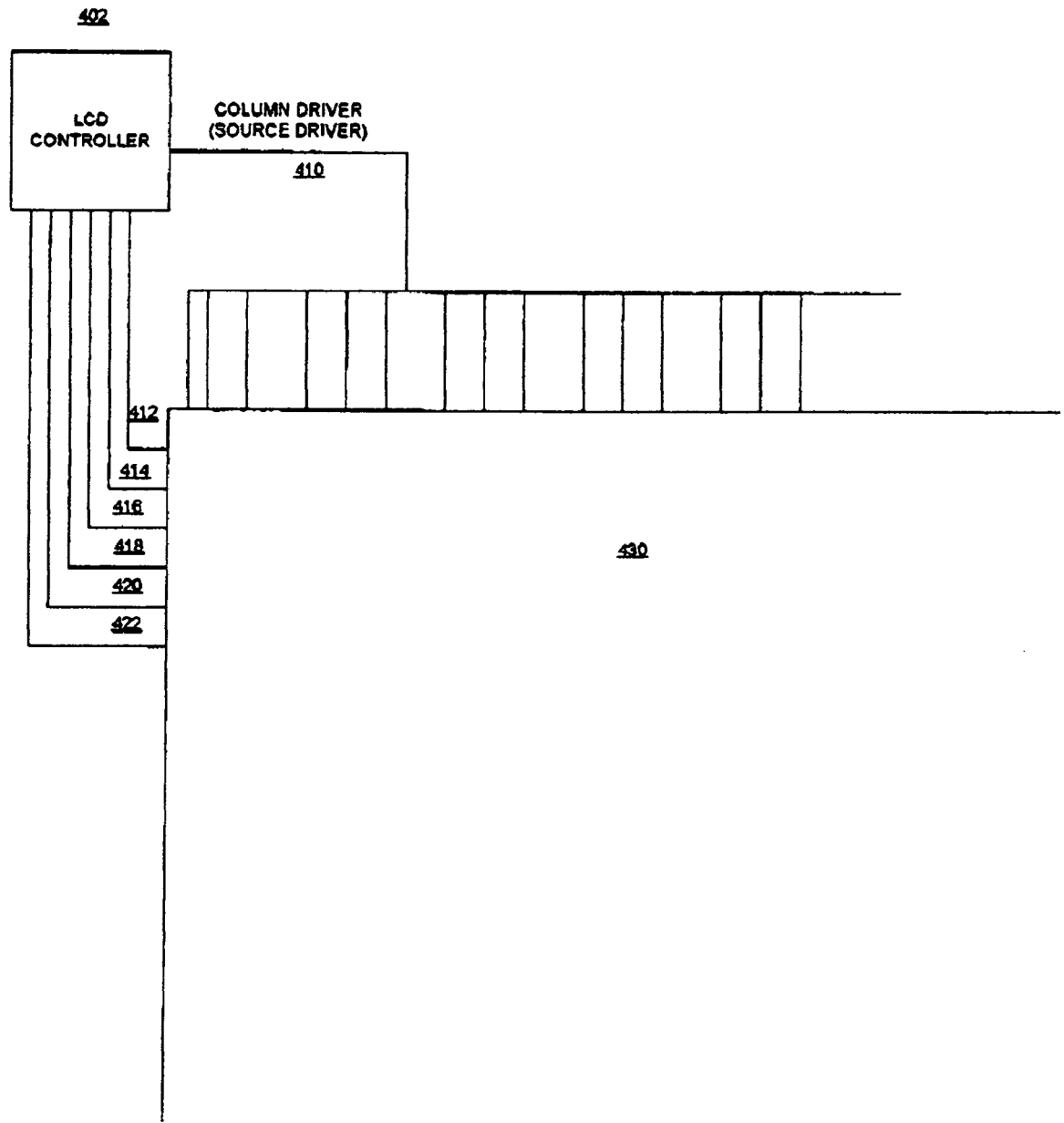
FIG. 4 illustrates an embodiment of the liquid crystal display and liquid crystal display controller of the present invention.

FIG. 4 illustrates an embodiment of the LCD controller 402 and LCD 430 for the method of the present invention. The LED controller may be internally adapted to provide a sequence of lights each centered on a specific wavelength according to the LEDs energized, followed by light generated simultaneously from all LEDs or at least two LEDs generating light centered on two different wavelengths. In FIG. 4, in synchronization with the LED controller, the LCD controller 402 creates a grey scale pattern for each light centred on a specific wavelength according to column driver 410 (source driver) and row selectors 412-422 (gate driver) in a X-Y matrix arrangement For a red light pattern, only pixels selectable by the column driver 410 may be set to a transmissive state to provide a desired pattern. Pixels that do not have a red component of light are turned off. For green and blue light patterns, similar procedures are followed. When all red, green, and blue colours are transmitted through a given pixel, that pixel may have a white or whitish appearance because of the blending of the three primary colours perceived by a viewer. Advantages in using the light source to determine colours include elimination of a colour filter layer, thus enhancing brightness of the display by reducing a light absorbing layer, and increasing the resolution as only one pixel is needed to provide full colour instead of separate red, green, and blue pixels. The size of a pixel is allowed to increase while resolution is improved; in other words, using the light source and not the LCD to determine colour optimizes substrate real estate usage.

Figure 5:
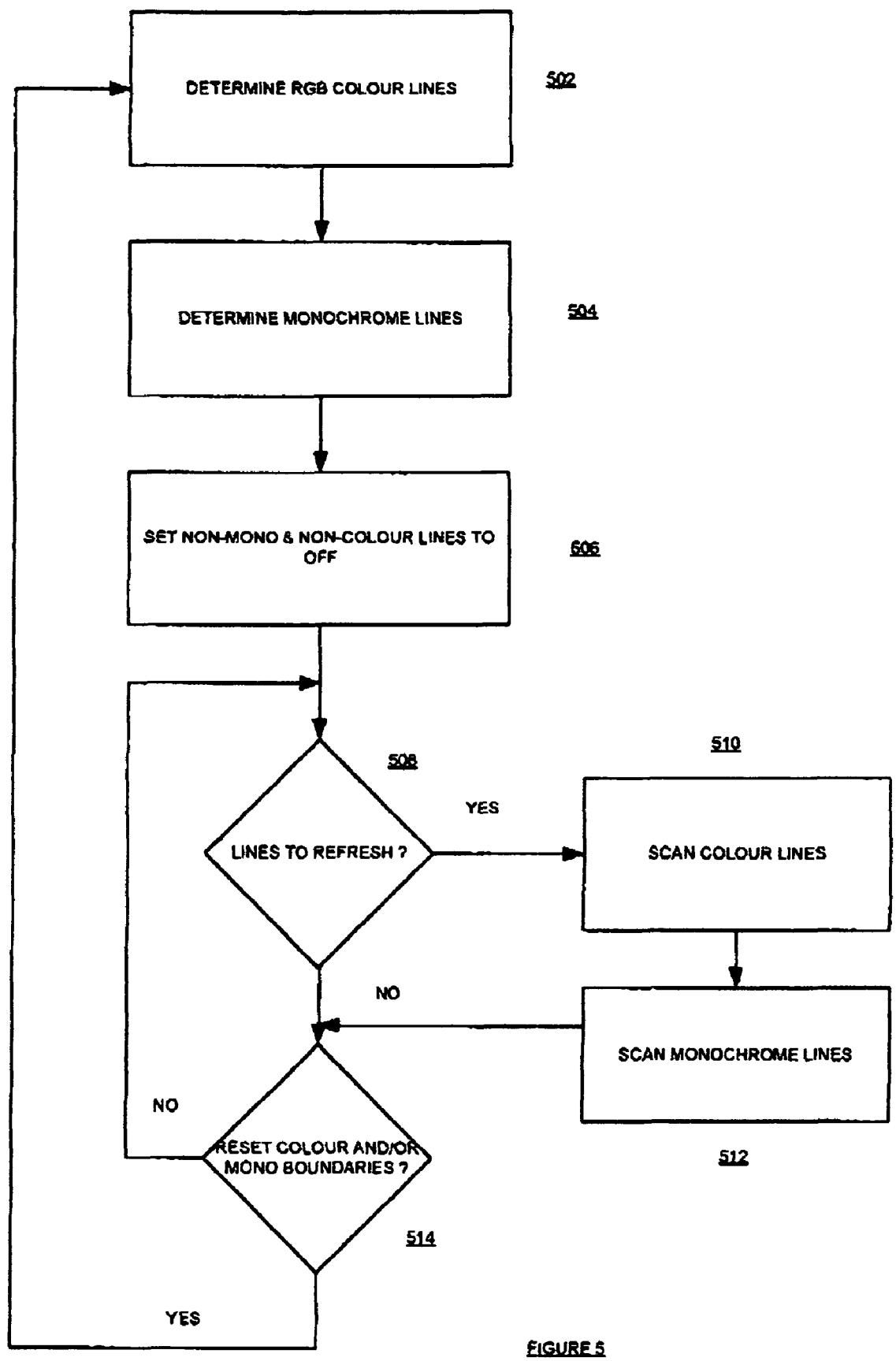
FIG. 5 illustrates a flow chart of a method of the present invention.

The method of the present invention is generally shown in FIG. 5. Although this embodiment is directed to the division of the LCD screen into monochrome and colour regions, other schemes are contemplated such as high bit rate colour, low bit rate colour, mono colour, etc. A processor designates certain lines as colour 502 or monochrome 504. Remaining lines are considered to be in an off state 506. If the display screen is operational in a display mode 508, then all colour lines are scanned 510 before any monochrome lines are scanned 512. The reason the colour lines are scanned first is because they have a clocking scheme that is different than the monochrome lines. In other embodiments, monochrome lines may be scanned before colour lines. If the monochrome and/or colour lines are to be changed 514, the new configuration is determined by repeating steps 502-506. Scanning in a colour region involves a first sweep of each line in the region before any of the lines in the colour region are swept a second or successive time.

Figure 6:
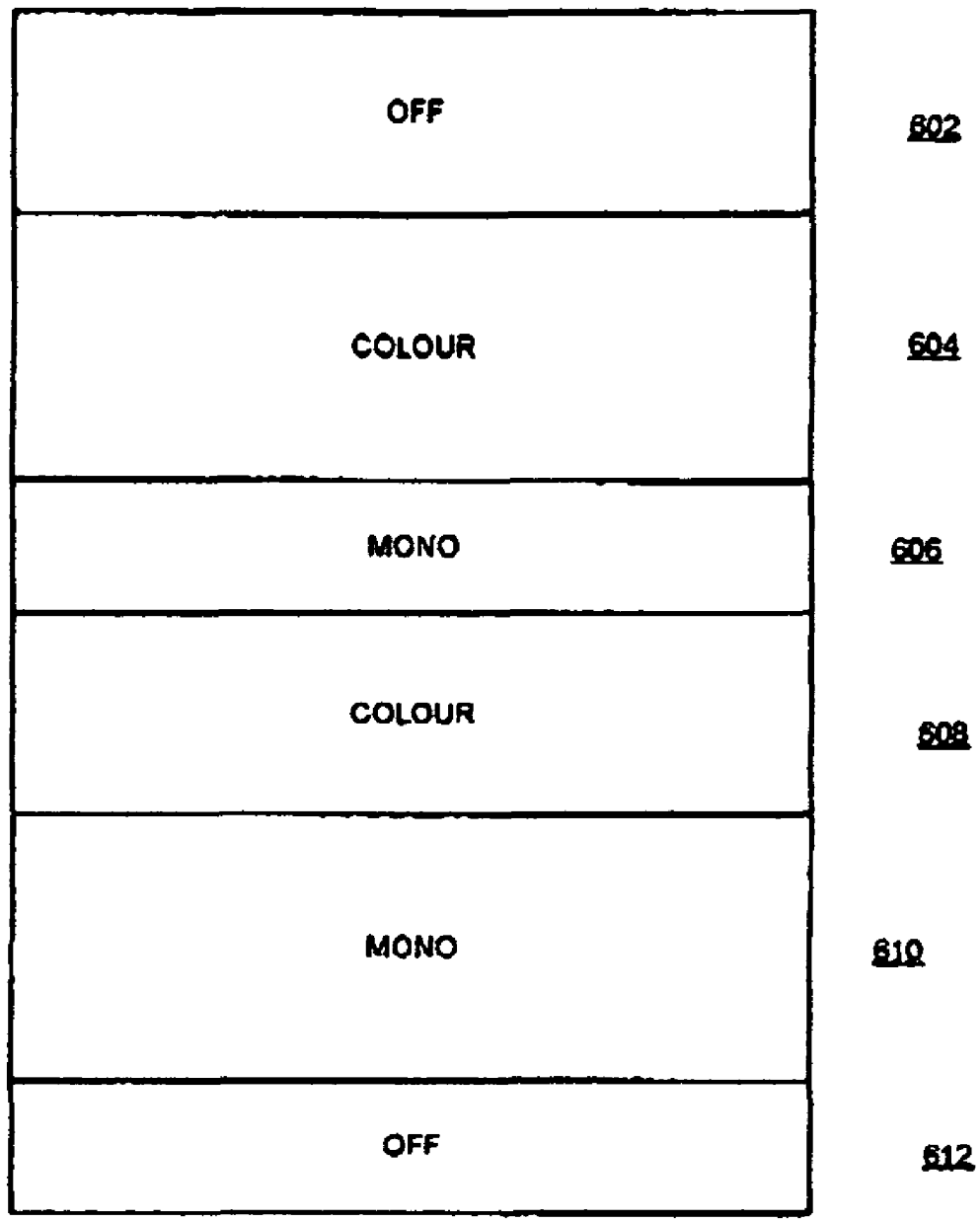
FIG. 6 illustrates an exemplary division of a display screen in accordance with the present invention.

FIG. 6 illustrates an embodiment of the general display screen in the present invention. The top and bottom regions of the display 602, 612 are turned off. The colouration of the off region is dependent upon the characteristics of the unbiased liquid crystal material and the orientation of any polarizers. In the exemplary division of the display screen, a colour region 604, a monochrome region 606, another colour region 608, and another monochrome region 610 are located between the top and bottom off regions 602, 612. Many other arrangements art clearly possible; however, in the present invention, the display screen is basically divided into horizontal bands that are in one of three modes: colour, monochrome, or off. For example, the display screen may be divided into a monochrome region and an off region, a monochrome region and a colour region, or a colour region and an off region.

Figure 7:
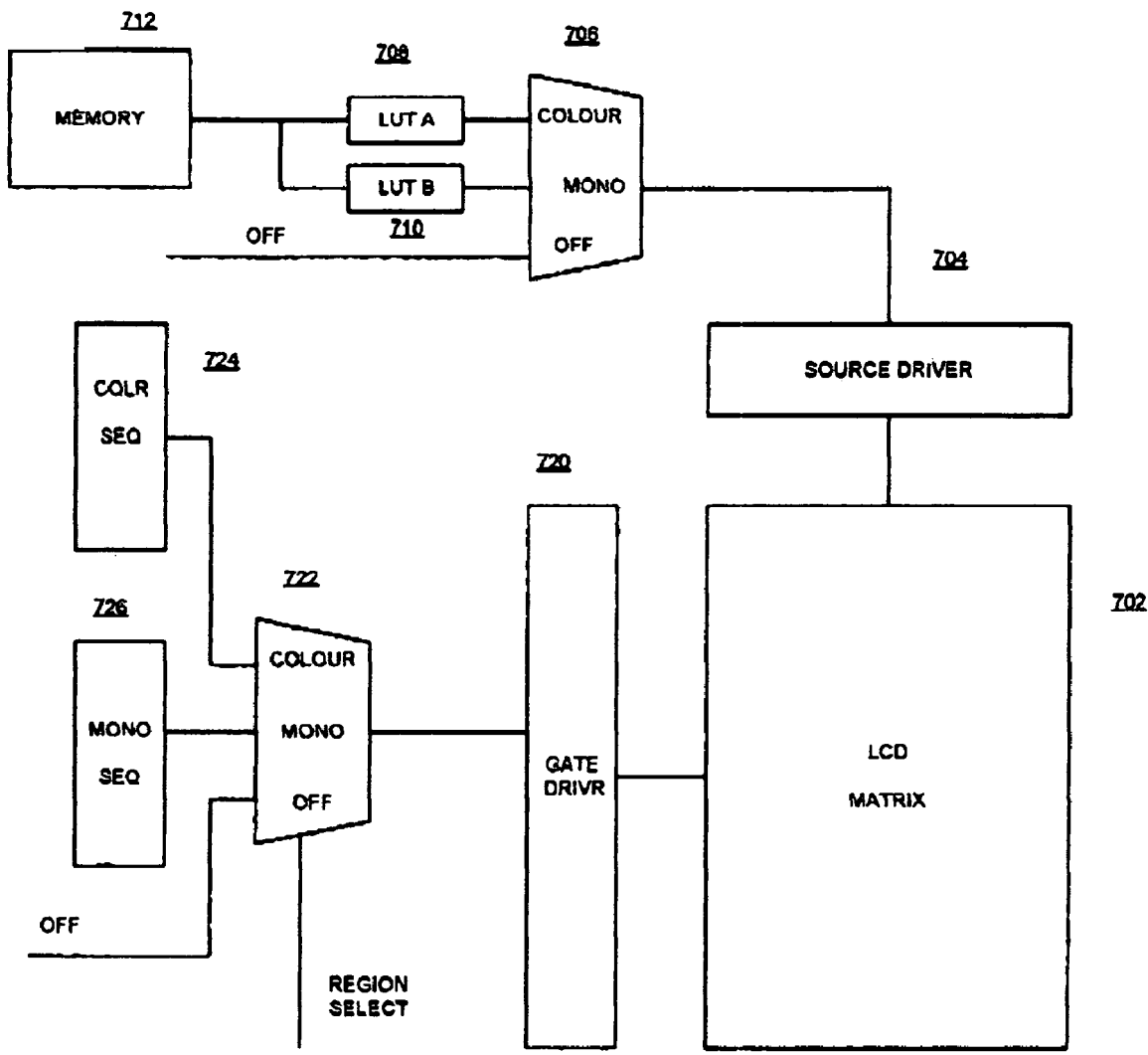
FIG. 7 illustrates a block diagram of an LCD and LCD controller of an embodiment.

FIG. 7 illustrates a block diagram an embodiment of the LCD controller elements and the LCD. The grey level for the pixels is provided through the source driver 704. A memory 712 is used to provide image data. The memory may be volatile, such as random access memory, or non-volatile, such as read only memory. The image data is used to access a bit pattern for providing grey scale or toggling for a pixel through a lookup table. Lookup table A 708 provides a pattern of multiple bits representing or correlating to a grey scale value. Preferably, the bits in a pattern number at least six and may be eight, ten, twelve, or sixteen in number. Lookup table B 710 provides a single bit or bit sequence representing an on or off state for a pixel in a monochrome region or line on the display screen. Optionally, an off state value may be provided in which the source driver will not bias the liquid crystal display pixel selected by switch (i.e., multiplexer) 706. The gate line driver operates to sweep each of the two types of scannable regions separately. That is, the colour region scan sequence storage element 724 will be accessed and used to scan the designated portions of the display screen 702 before or after the monochrome sequence storage element 726 is accessed for scanning. The monochrome scan sequence storage element 726 is scanned at a rate different than the rate for the colour sequence storage element 724. Switch 722 provides the correct sequence to the gate driver 720, and, optionally during the remaining time, disables the gate for OFF regions.

Figure 8:
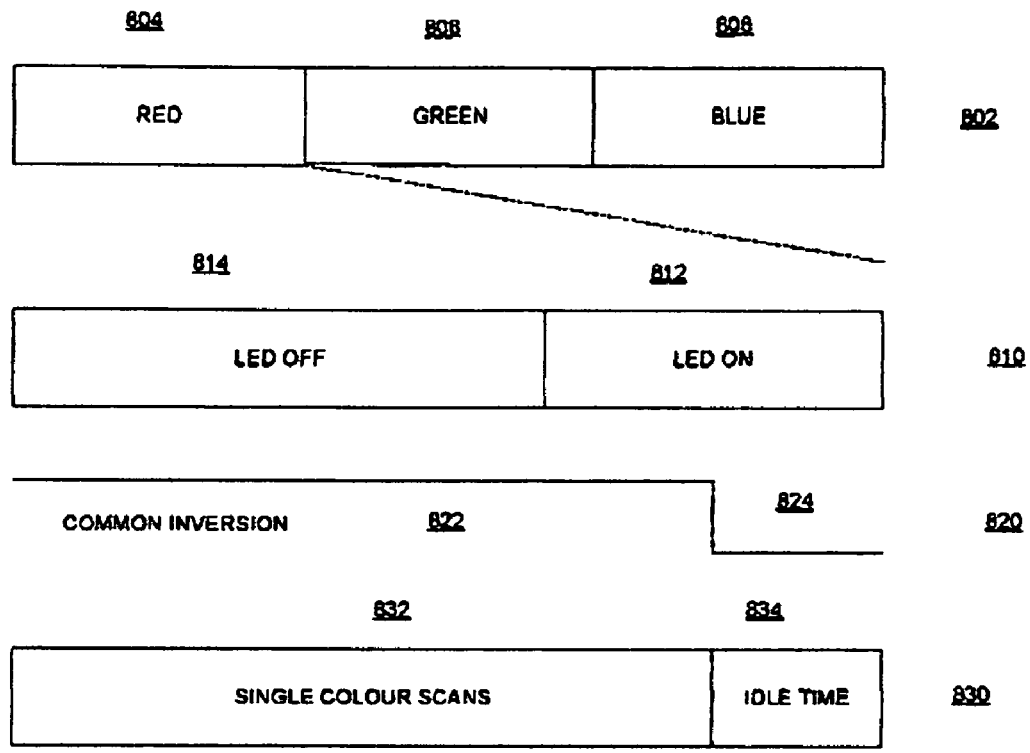
FIG. 8 illustrates a timing scheme for the light source and the display scans.

FIG. 8 illustrates a colour only mode in which either the entire display screen is in colour or the non-colour portion of the display screen is in the off state. In operation, pixel grey scale is achieved through pulses written to a pixel during scanning. Each colour frame 802 is divided into three parts (or fields) 804, 806, 808 for the three colours in full colour mode. Each pixel to be illuminated by a specific colour of light achieves a grey scale value from a pulse pattern into the source of the thin film transistor providing charge to the pixel. The pulse pattern (i.e., colour scans) includes multiple high and/or low pulses for each pixel. One pulse is applied to each colour pixel during a scan of the colour region that includes the colour pixel. During the colour region scan (or sweep) 832, the actual scanning occupies most of the time allotted 830 for a given colour. It is the successive scans of the colour pixels during a fame that establishes a grey scale value. A smaller portion of the time allotted in a scan period is idle time 834. During most of the scan period, the light source is turned off 814. In alternative embodiments, the light source may remain on for most or all of the scan period and/or the actual scanning may occupy a different portion of the time allotted for a given colour. Once the final grey scale value for a row or line of pixels is fairly well established, the light source (e.g., light emitting diode) is turned on 812. In some embodiments, during the light source turn on time, the common electrode of the display is inverted from a first voltage bias level 822 to a second voltage bias level 824 to prevent charge buildup in the liquid crystal that would degrade performance and damage the display. The inversion of the common electrode voltage occurs for each colour for each frame. Thus, for a red, green, and blue pixel LCD, the common electrode voltage is inverted three times. Other inversion modes are contemplated by the present invention such as line inversion and pixel inversion. In line inversion, a given line may be alternately supplied through the source driver with voltages from a first set of a polarity and then supplied with voltages from a second set of a polarity opposite to that of the first set; that is, a non-inverting pair of voltages may be applied and an inverting pair of voltages may later be applied. In pixel inversion, alternate columns may be supplied for each row with voltage sets of opposing polarities.

Figure 9:
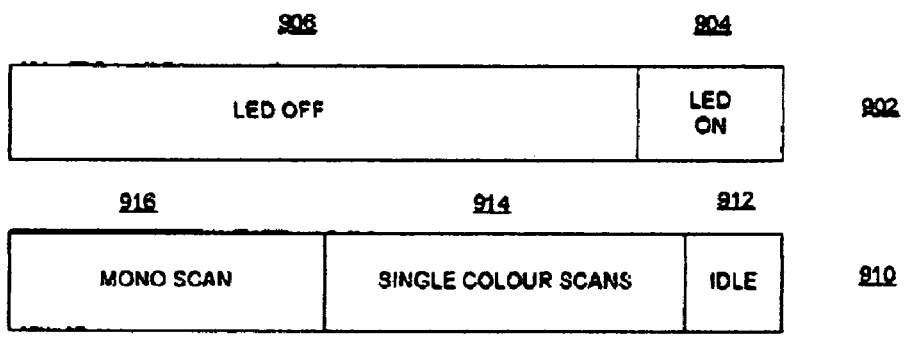
FIG. 9 illustrates an embodiment of the relative timing between the light source and the LCD.
Figure 10:
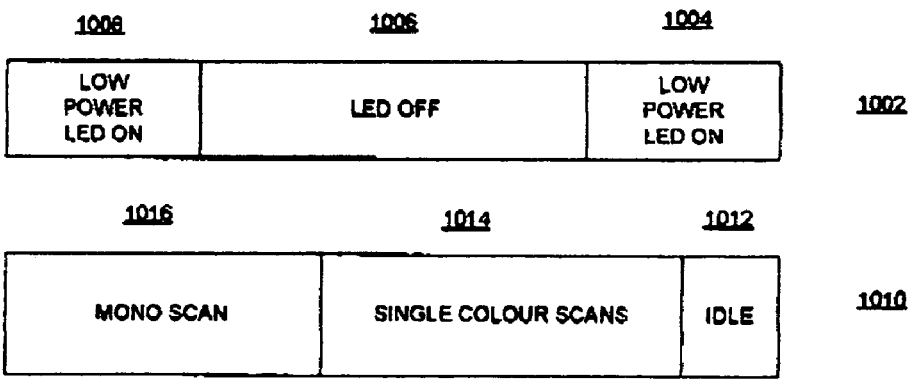
FIG. 10 illustrates an alternate embodiment of the relative timing between the light source and the LCD.

The power savings advantage of the present invention arises from the reduction of switching in the monochrome region. FIGS. 9 and 10 illustrate two embodiments for a single frame of the display having both monochrome and colour regions. In FIG. 9, the monochrome scan 916 occurs in which each pixel is activated once. During the monochrome scan, one clock pulse is used to set an on or off value for the monochrome pixels, resulting in less switching power dissipation. Then, the grey scale values are developed 914 by multiple pulses firm the gate line driver in which the source driver is loaded with new data during the multiple scans corresponding to a single colour in a field. During most of the scan time, there is no illumination 906. Toward the end of the scan, the light source of the designated colour is turned on 904 while the gate driver becomes idle 912. FIG. 10 represents an alternative embodiment in which the monochrome and colour scans 1016, 1014 are the same as in FIG. 9, but the light source is operated at lower power for a longer period of time 1004, 1008 with a short LED OFF time 1006.

Figure 11:
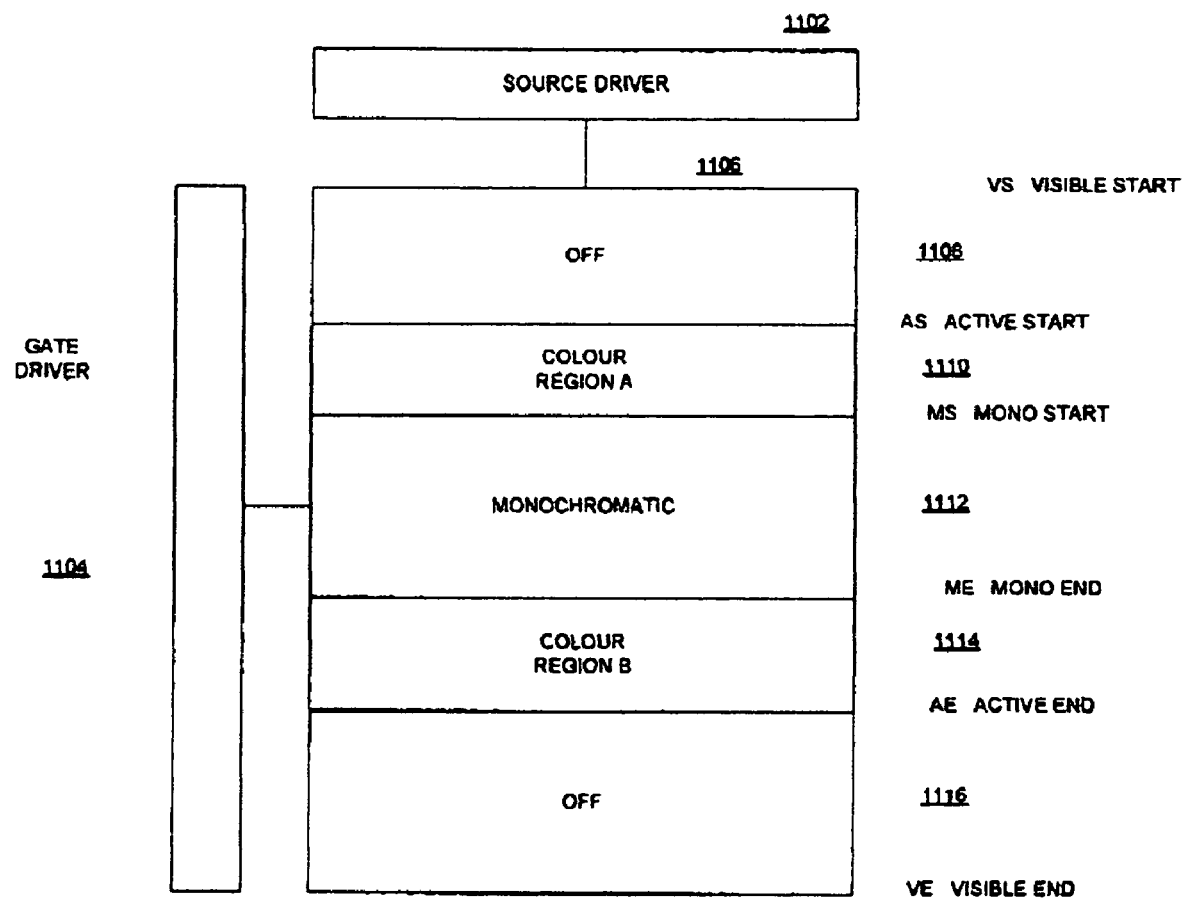
FIG. 11 illustrates a specific embodiment with optional off regions.
Figure 12:
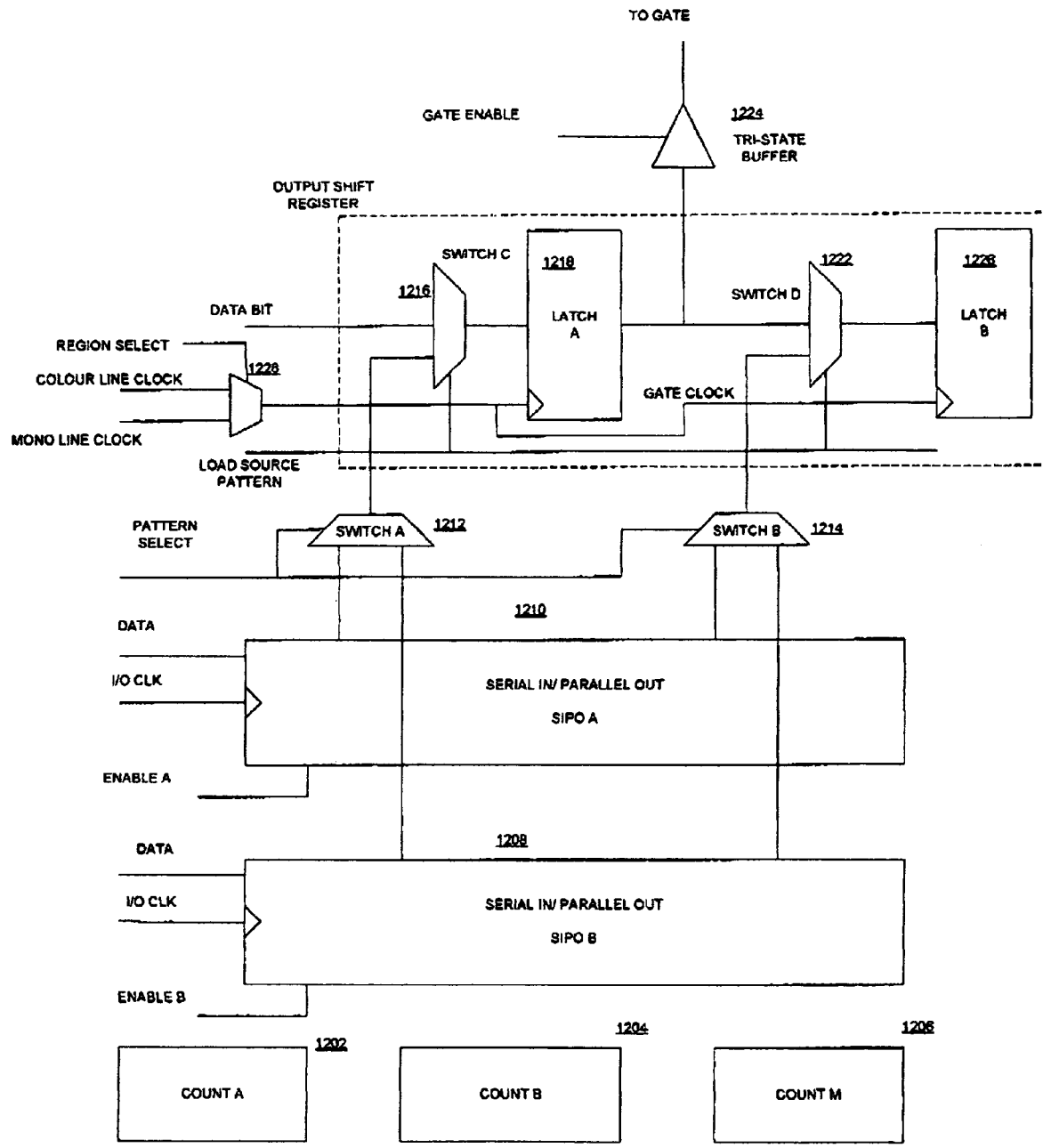
FIG. 12 illustrates an embodiment of a section of the gate line driver.

FIG. 11 represents a more specific embodiment of the present invention in which the display screen is divided into relatively few regions in which pixels are activated by source driver 1102 and gate driver 1104. At the top and bottom of the display screen are off regions 1108, 1116. At the center of the display screen is a monochrome region 1112 between two colour regions 1110, 1114. Two output shift registers (e.g., serial in/parallel out shift registers) A, B, as illustrated in FIG. 12, are used for scanning the two colour regions. Shift register A 1210 and shift register B 1208 contain initialization values for the gate shift register of regions A and B, respectively. They preferably contain a one-hot encoding of the starting line number of their respective regions. (As used in an embodiment of the invention, one-hot encoding refers to a single active bit that is shifted through the shift register such that only one line at a time of pixels is written to from the source driver.) First shift register A 1210 is loaded and then used to sweep the first colour region once, then shift register B 1208 is loaded and then used to sweep the second colour region once. The shift registers alternate until the number of scans in that frame have all been completed. During the colour regions scan time, the clock rate COLOUR LINE CLOCK is relatively high. For example, a 10 MHz clock may be used. After the colour regions are scanned, the monochrome region is scanned using a slower clock MONO LINE CLOCK to enter a binary value into the pixel to cause the pixel to be on or off. A switch 1228 may be used to transfer either COLOUR LINE CLOCK or MONO LINE CLOCK to storage elements 1218, 1226 according to the region by the REGION SELECT signal in FIG. 7. The storage elements 1218, 1226 may be latches that latch data on the rising or falling edges of a clock, D type flip flops, or the like. Counters 1202-1206 are used to hold the number of lines in each region. In an alternate embodiment, each colour region is scanned multiple times before any other colour region is scanned. In another embodiment, the monochrome region(s) is scanned before the colour region(s) is scanned.

Figure 14:
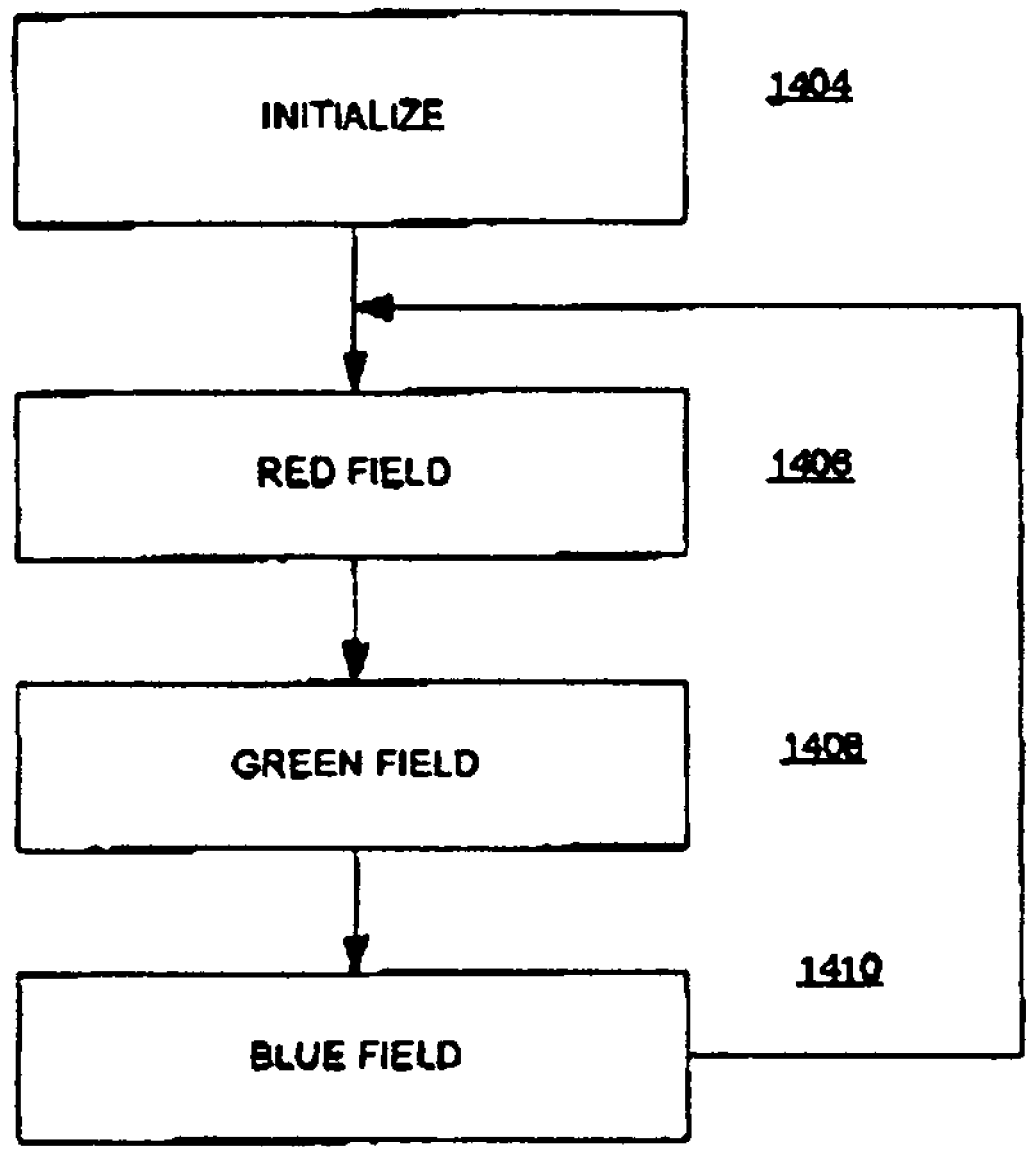
FIG. 14 illustrates a general overview of the method of FIG. 13.

FIG. 14 illustrates an overview of the embodiment of a method of the present invention corresponding to the display scanning system of FIG. 12. In the general method, initialization occurs 1404 (e.g., registers are initialized) and the three colour fields are cycled through 1406-1410 through successive scans during a frame. Mono regions may be updated during all, some, or a single one of the colour fields.

Figure 13:
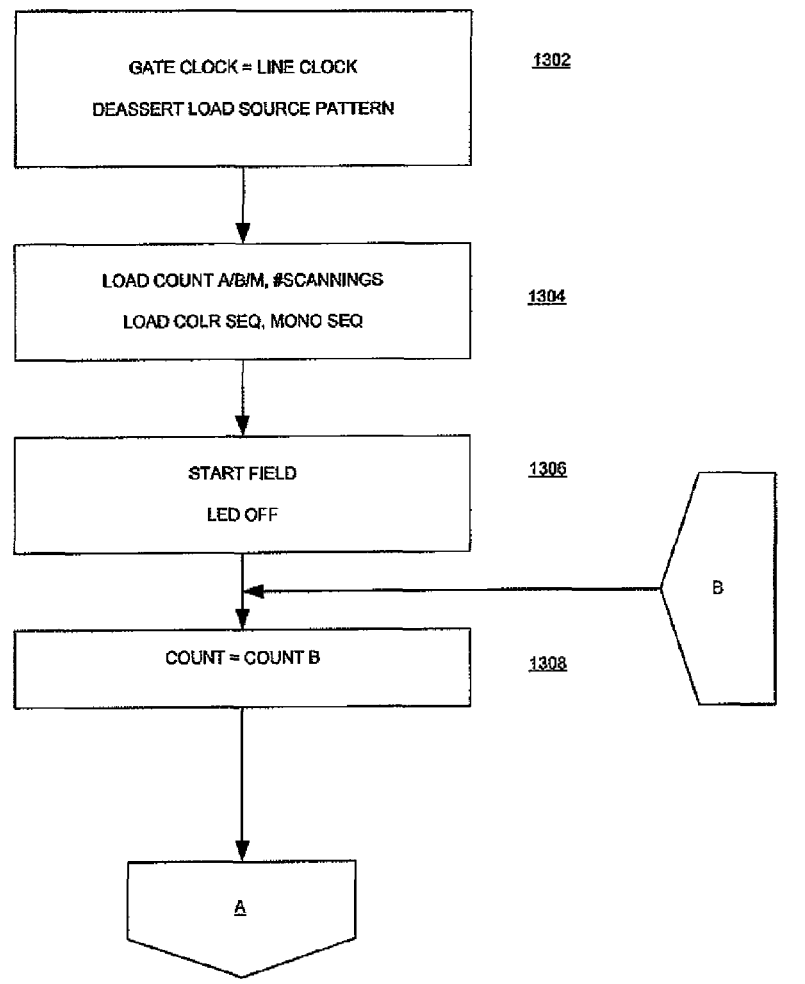
FIG. 13 illustrates a flow chart for scanning the specific embodiment of FIG. 11.
Figure 13:
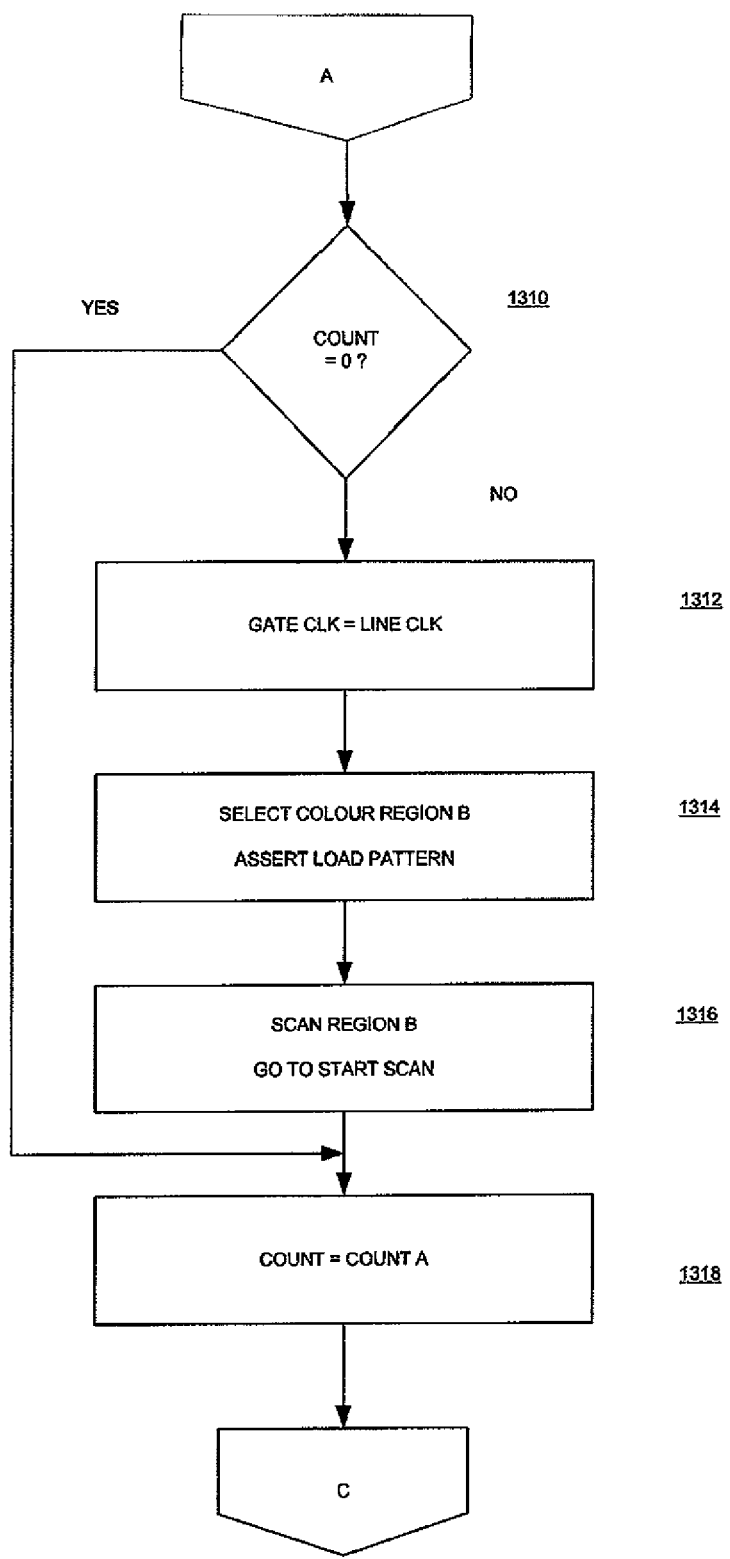
Figure 13:
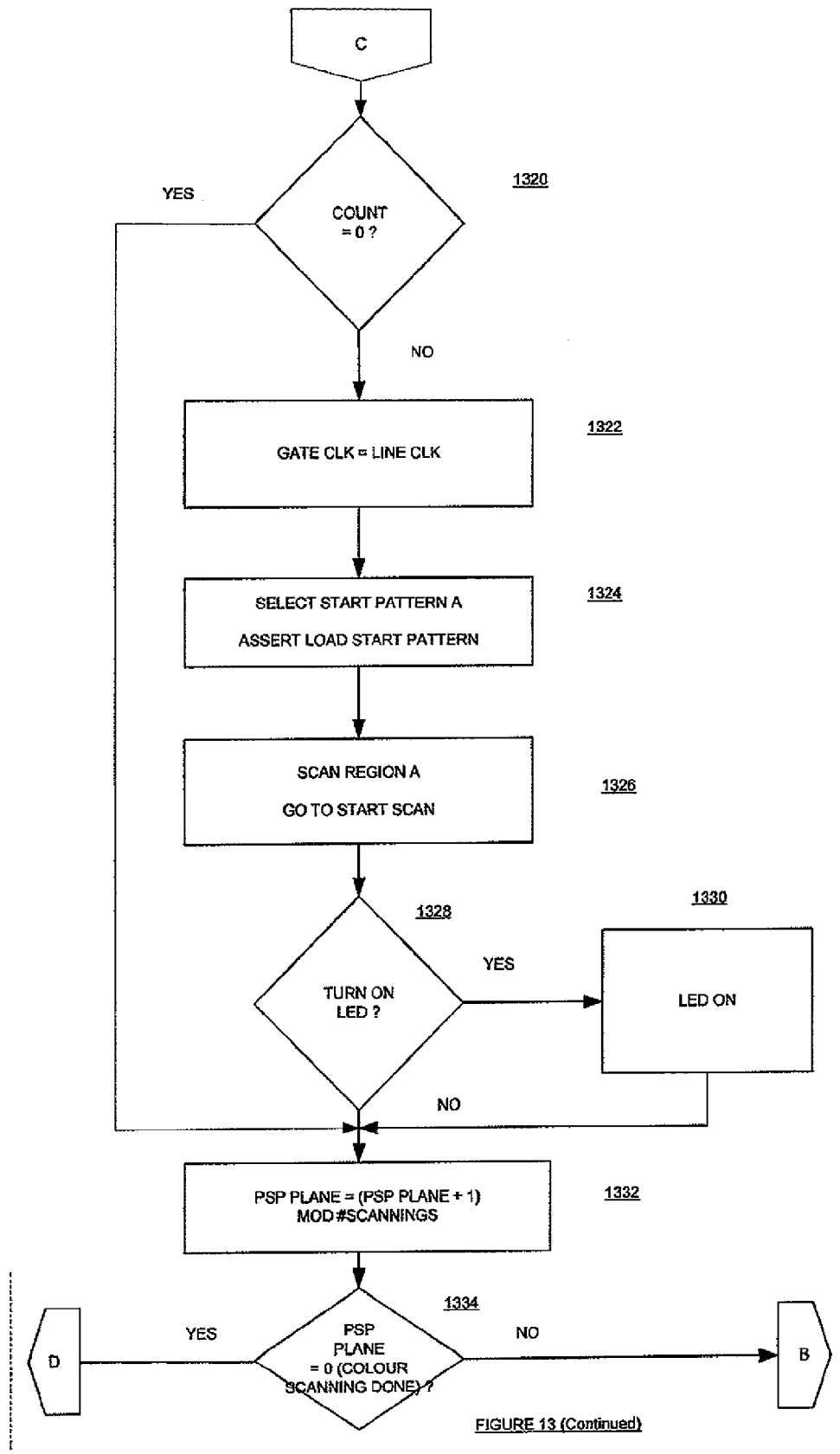
Figure 13:
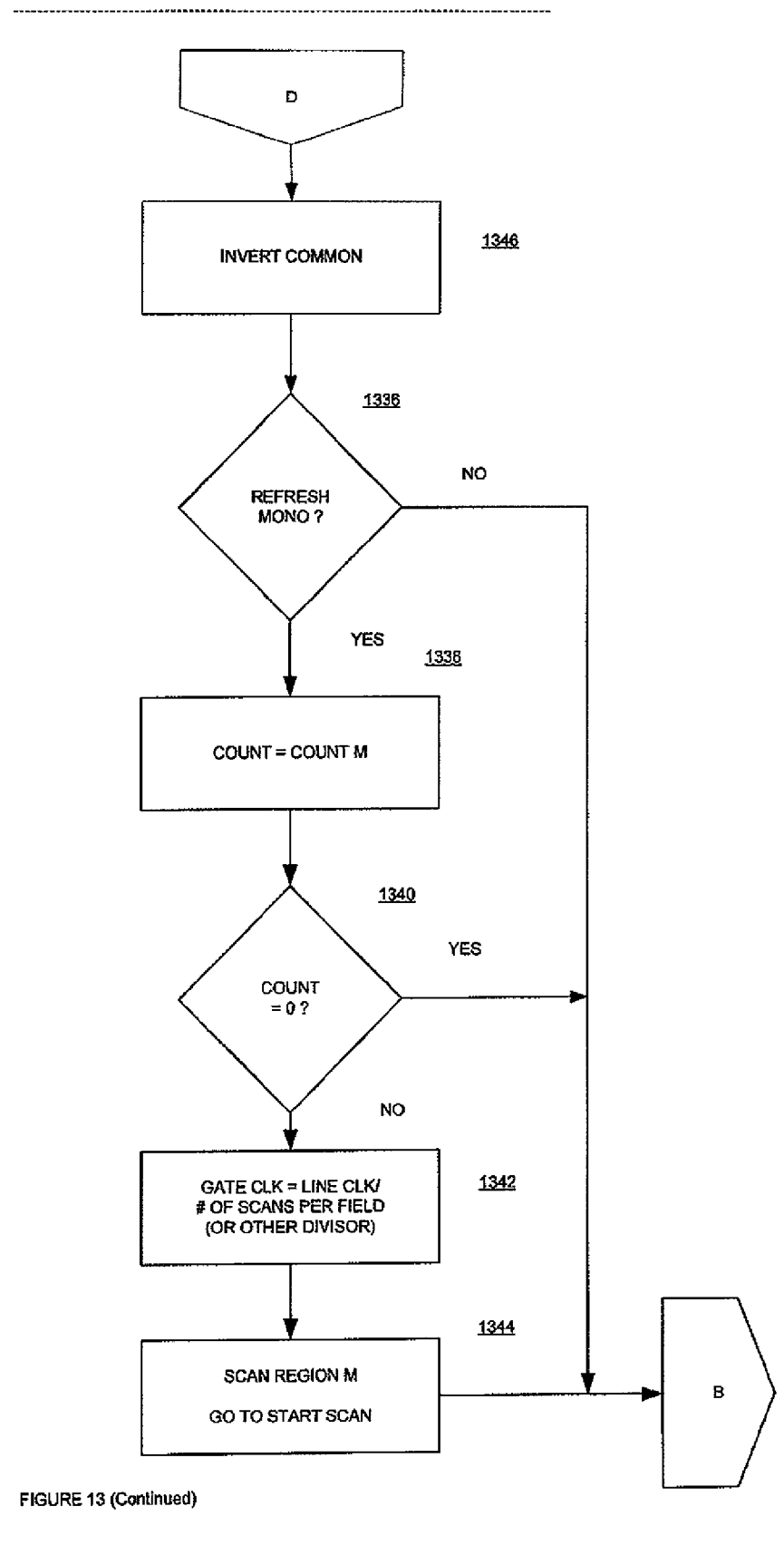
Figure 15:
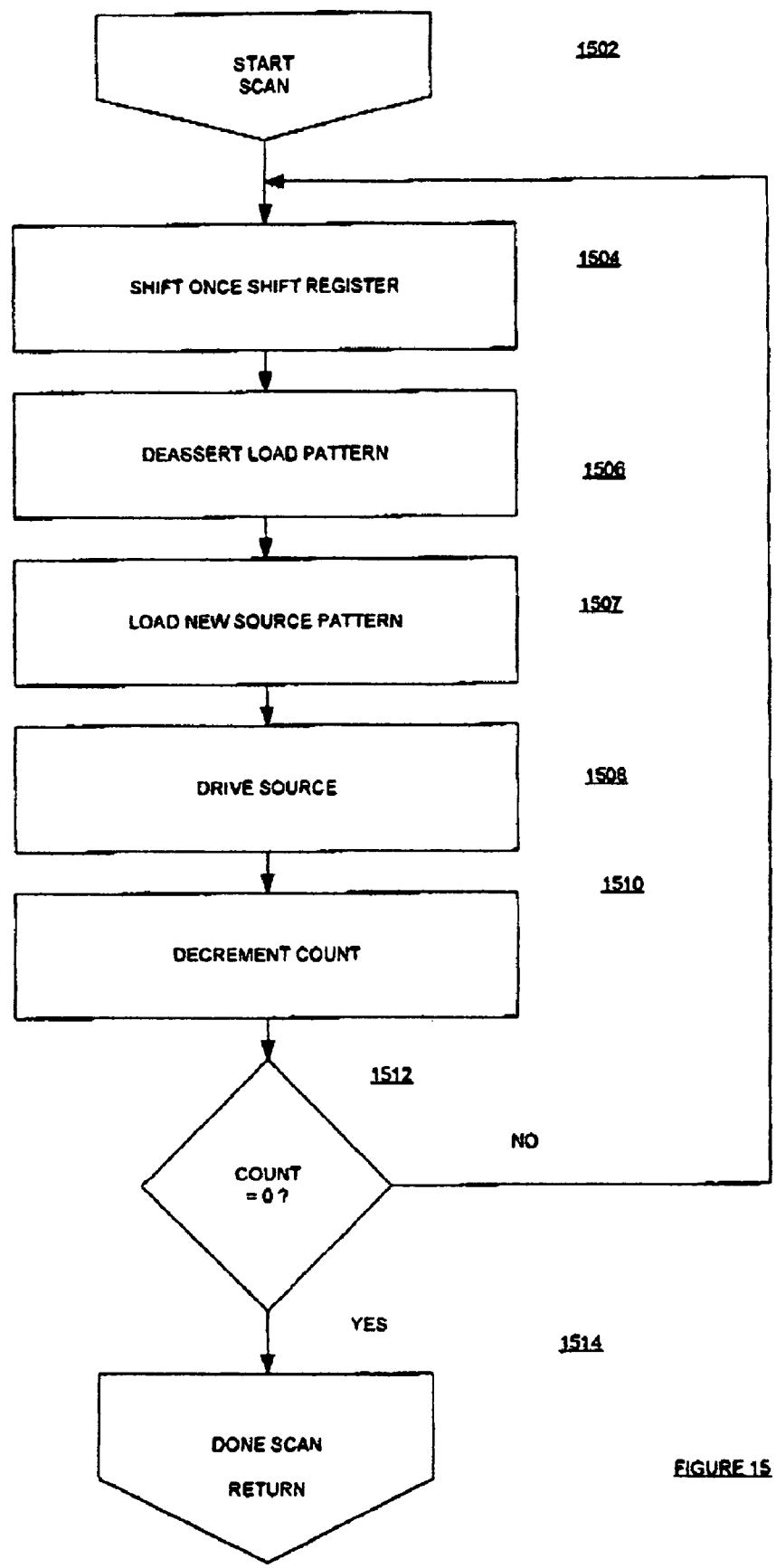
FIG. 15 illustrates further detail of an embodiment of the scanning for one colour within one frame.

FIG. 13 illustrates a more detailed embodiment of the method of FIG. 14. Initially, the gate clock is set equal to the COLOUR LINE CLOCK through switch 1228. The LOAD SOURCE PATTERN of FIG. 12 is deasserted 1302 to enable the OUTPUT SHIFT REGISTER to shift its data. The counters 1202-1206 are loaded, the number of scannings per colour are loaded, and the colour and monochrome storage elements 1208-1210 are loaded 1304. The light source is turned off 1306. Colour region B's count 1204 is loaded 1308. For each count of the counter, as long as the counter has not timed out 1310: the gate clock is switched at the COLOUR LINE CLOCK rate 1312, the gate shift register is initialized 1314 to start scanning at the beginning of colour region B 1114 by using switch A and B (FIG. 12) and asserting LOAD SOURCE PATTERN (FIG. 12), and a succession of gate clocks causes each row of colour region B 1114 to receive a new source pattern 1507 which is used to load unique lines (rows) in colour region B 1114 of the display screen 1316. Then, colour region A's counter is loaded and a similar process is repeated but for region A 1110 for each count of the counter, as long as the counter has not timed out 1320, 1322, 1324, 1326. After the colour regions have been sufficiently scanned in order to establish their grey scale values, the light source is turned on 1328, 1330. After the colour regions have been completely scanned (i.e., the pulse sequence plane is zero) 1332, 1334, the common electrodes polarity is inverted 1346. If it is determined that the monochrome region is to be refreshed 1336, a counter is loaded with the number of lines count M 1338 in the monochrome region and the monochrome region is scanned 1344 once, if the count is not zero, at a reduced clock rate 1342 that is determined by dividing the line clock by the number of scans per field to yield the MONO LINE CLOCK The reduced clock rate may be established by other means and may occupy the idle time period The method of FIG. 13 may be entered in a variety of other ways. In one embodiment, in normal mode, the serial in/parallel out shift registers A, B may be loaded with counts, and then the mode is switched to partial colour. After the first line is referenced, the gate driver output is disabled. Then, when mono start is retrieved, the gate driver output is enabled. The gate clock is slowed. Each line of the monochrome region is driven until the end of the monochrome region is reached. The clock is switched to a fast gate clock relative to the monochrome region clock rate. Each line of the colour region B is driven until the end of colour region B. The output shift register is reset to SIPO A. Each line of colour region A is driven until the end of colour region A. Then, the output shift register is reset to SIPO B unless the predetermined number of scans to achieve grey scale has been performed for the frame. If the predetermined number of scans has been reached, then the gate clock is disabled, the light source is turned on, and the common electrode is inverted A determination is made as to whether to resume normal mode. If not, then partial colour mode is maintained and the processing begins again by slowing down the gate clock. Otherwise, normal mode is assumed in which the fast gate clock is used to control the pixel gates of the display and the gate driver output is disabled until the first line is ready for data transfer. By illustrative example, if M represents a monochrome region scan and BA represents a scan of colour regions B and A, then the process may be depicted as: M BA BA BA BA BA BA BA BA BA BA BA BA invert wait—in which the light is turned on during the last one or last few of the colour region BA scans, the invert period, and the wait period FIG. 15 illustrates a more detailed embodiment of a scan for a field. The gate line driver is shitted once 1504. The load pattern is deasserted 1506. A new source pattern is loaded 1507. The source lines on the display matrix are driven 1508. The line count is reduced by one 1510. As long as the counter does not expire (e.g., the line count remains greater than zero in a count down mode) 1512, scanning resumes at step 1504.

The above-described embodiments of the present application are intended to be examples only. Those of skill in the art may effect alterations, modifications and variations to the particular embodiments without departing from the scope of the application. The invention described herein in the recited claims intends to cover and embrace all suitable changes in technology.

We claim:

1. A method for generating a frame of an image on an LCD screen of a handheld wireless communications device having a plurality of light-sources, comprising:

scanning a first region of contiguous lines of field sequentially driven liquid crystal pixels to produce a colour region on the LCD screen, using a source driver and a gate driver driven at a first frequency; and scanning a second region of contiguous lines of field sequentially driven liquid crystal pixels to produce a monochrome region on the LCD screen, using said source driver and said gate driver driven at a second frequency less than said first frequency, wherein said colour region is produced by scanning, in said frame, said first region a first number of times; and wherein said monochrome region is produced by scanning said second region a second number of times such that said first number of times is N times said second number of times, such that switching losses in said colour region is less than switching losses in said monochrome region; and activating said light sources during a portion of said frame.

2. The method of claim 1, wherein N is a positive integer and obeys a selected one of the following relationships: i) N is greater than three; ii) N is between six and sixteen, inclusive: iii) N is between six and twelve inclusive; iv) N is equal to six; v) N is equal to eight; and vi) N is equal to ten.

3. The method of claim 1, further comprising scanning a third region of contiguous lines of field sequentially driven liquid crystal pixels to produce a second colour region on the LCD screen.

4. The method of claim 3, wherein said second colour region is performed by scanning in said frame, said third region by a third number of times.

5. The method of claim 4, wherein said third number of times is the same as said first number of times.

6. The method of claim 4, wherein said third number of times is different from said first number of times.

7. The method of claim 3, wherein said second colour region is different from said first colour region.

8. The method of claim 7, wherein at least one of said first colour region, said second colour region and said monochrome region comprises a bit rate colour scheme different from a bit rate colour scheme of at least one other region.

9. The method of claim 1, further comprising leaving at least one line of pixels in an off state.

10. The method of claim 1, wherein said frame comprises a first portion respective to said first region and a second portion respective to said second region; and wherein pixels in each of said portions are refreshed at different frame rates.

11. The method of claim 1, wherein said monochrome region is comprised of black and white.

12. The method of claim 1, further comprising the steps of:

receiving a source pattern for said frame for presenting on the LCD screen, said pattern including at least said first region and said second region;

receiving a number of lines respective to each region, each of said lines including a plurality of pixels;

receiving a pulse sequence per region corresponding to a desired pattern for that region wherein one of said pulse sequences consumes less power than at least one other of said pulse sequences;

receiving a light sequence corresponding to each said region;

scanning each liquid crystal pixel in each line respective to each region according to said pulse sequence respective to that region; and activating said light sources according to said light sequence respective to each said region.

13. The method of claim 12, wherein said light sources are comprised of three separate colours red, green and blue or cyan, magenta, and yellow.

14. The method of claim 13, said light sequence is comprised of three sequential parts respective to each said colour.

15. The method of claim 14, wherein each said colour is turned on during all of its respective said part.

16. The method of claim 14, wherein each said colour is turned on during a portion of its said respective part.

17. The method of claim 12, wherein said scanning step comprises scanning one of said regions before scanning another of said regions.

18. The method of claim 12, wherein said pattern includes a third region of contiguous lines of field sequentially driven liquid crystal pixels to produce a second colour region on the LCD screen, wherein said scanning step comprises simultaneously scanning said first region and said third region.

19. The method of claim 1, wherein scanning the first region of contiguous pixel lines occurs three times in a frame.

20. The method of claim 19, wherein each of the three times corresponds to a different colour of illumination light.

21. A wireless communications device comprising: an LCD screen having multiple lines of liquid crystal pixels arranged in a matrix; said LCD operable to generate a frame of an image having at least one colour region and at least one monochrome region;

a source driver and a gate driver for scanning said pixels according to a pulse sequence per region corresponding to a desired pattern for that region, said source driver and said gate driver driven at a first frequency to produce said colour region, and said source driver and said gate driver driven at a second frequency less than said first frequency to produce said monochrome region, wherein said colour region is produced by scanning, in said frame, said first region a first number of times; and wherein said monochrome region is produced by scanning said second region a second number of times such that said first number of times is N times said second number of times, such that switching losses in said colour region is less than switching losses in said monochrome region; and a plurality of light sources operable according to a light sequence corresponding to each said region.

22. The wireless communications device of claim 21, wherein said light sources include light emitting diodes.

23. The wireless communications device of claim 22, wherein a first one of said light emitting diodes emits red light, a second one of said light emitting diodes emits green light, and a third one of said light emitting diodes emits blue light or a first one emits cyan light, a second one emits magenta light, and a third one emits yellow light.

24. The wireless communications device of claim 21, wherein said source driver is loaded with values to drive source lines of a sequentially selected row of said pixels by shifting a bit through a shift register to drive gates in said matrix; and wherein said sequential selection of rows is accomplished by selectively loading one shift register selected from a plurality of shift registers.

25. The wireless communications device of claim 21, further comprising a display controller for controlling the display screen and a light source controller for controlling the light source.

26. The wireless communications device of claim 25, wherein the display controller controls operations of the light source controller.

27. The wireless communications device of claim 21, wherein each pixel in the one of said regions is capable of being scanned on between two and sixteen times, inclusive, for each time any pixel another of said regions is scanned.

28. The wireless communications device of claim 21, wherein the source driver is loaded with values to drive source lines of a selected row of the pixels.

29. The wireless communications device of claim 28, wherein the values are read from a look up table.

30. The wireless communications device of claim 28, wherein each of the values for the first region is multiple bits in length and each of the values for the second region is a single bit in length.

31. The wireless communications device of claim 28, wherein the gate driver is capable of selecting rows of pixels for monochrome mode and selecting other rows of pixels for colour mode.

32. The wireless communications device of claim 31, wherein selection of rows within a region is performed in a sequential manner.

33. The wireless communications device of claim 31, wherein the selection of rows in a sequential manner is accomplished by at least one of selectively loading one shift register selected from a plurality of shift registers and selectively loading one shift register selected from a plurality of shift registers.

* * * * *